United States Patent [19]

Katayama et al.

[11] Patent Number: 4,878,125

[45] Date of Patent: Oct. 31, 1989.

[54] METHOD AND APPARATUS FOR IMAGE PROCESSING WITH FED-BACK ERROR CORRECTION

[75] Inventors: Akihiro Katayama, Kawasaki; Hidefumi Ohsawa, Urawa; Izuru Sunohara, Ichikawa; Hiroshi Hosokawa; Masahiko Yoshimoto, both of Yokohama, all of Japan

[73] Assignee: Canon Kabushiki Kaisha, Tokyo, Japan

[21] Appl. No.: 140,029

[22] Filed: Dec. 31, 1987

[30] Foreign Application Priority Data

Jan. 8, 1987 [JP] Japan .............................. 62-002670
May 21, 1987 [JP] Japan .............................. 62-122612

[51] Int. Cl.$^4$ .............................................. H04A 1/40
[52] U.S. Cl. .................................... 358/443; 358/456
[58] Field of Search ............... 358/284, 283, 256, 280, 358/287, 284; 382/54

[56] References Cited

U.S. PATENT DOCUMENTS

| | | | |
|---|---|---|---|
| 4,084,196 | 4/1978 | Tisue | 358/280 |
| 4,196,454 | 4/1980 | Warren | 358/283 |
| 4,213,150 | 7/1980 | Robinson | 358/166 |
| 4,339,774 | 7/1982 | Temple | 358/283 |
| 4,547,811 | 10/1985 | Ochi | 358/282 |
| 4,668,995 | 5/1987 | Chen | 358/283 |
| 4,692,811 | 9/1987 | Tsuchiya | 358/282 |
| 4,733,230 | 3/1988 | Kurihara | 358/283 |
| 4,742,400 | 5/1988 | Tsuji | 358/284 |
| 4,794,531 | 12/1988 | Morishita | 382/54 |

OTHER PUBLICATIONS

"An Adaptive Algorithm for Spatial Grey Scale", Robert Floyd and Louis Steinberg, Stanford University, Stanford, CA, SID 75 Digest, pp. 36, 37.

Primary Examiner—Edward L. Coles, Sr.
Assistant Examiner—Jerome Grant, II
Attorney, Agent, or Firm—Fitzpatrick, Cella, Harper & Scinto

[57] ABSTRACT

There is an image processing apparatus for digitally processing an image. This apparatus comprises: a binarization circuit to binarize image data by a predetermined threshold value; a processor to correct errors generated in binarization; a first detector to detect an edge direction of the image from the image data; and a second detector to detect an edge quantum of the image from the image data. The process corrects the error data in accordance with the edge direction detected by the first detector or the edge quantum detected by the second detector. The errors to be corrected by the processor are the errors between the output concentration data after the binarization and the image concentration data. The processor adds weight coefficients to the error data in a predetermined range stored in a memory and then adds the weighted error data to image data to be newly binarized. The sum of the weight coefficients which are used in the weighting process is set to "1". With this apparatus, a high quality apparatus can be reproduced with a high fidelity from an original including many edges.

18 Claims, 17 Drawing Sheets

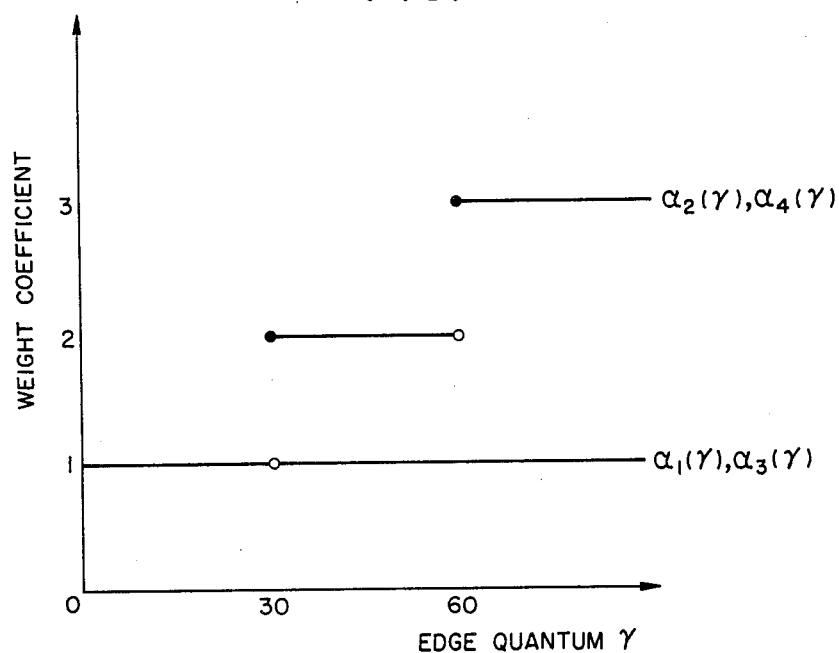

CONCERNED PIXEL

CONCERNED PIXEL

CONCERNED PIXEL

FIG. 6
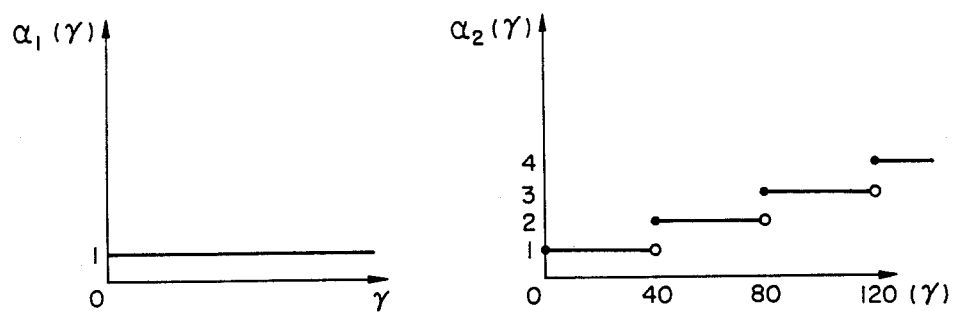
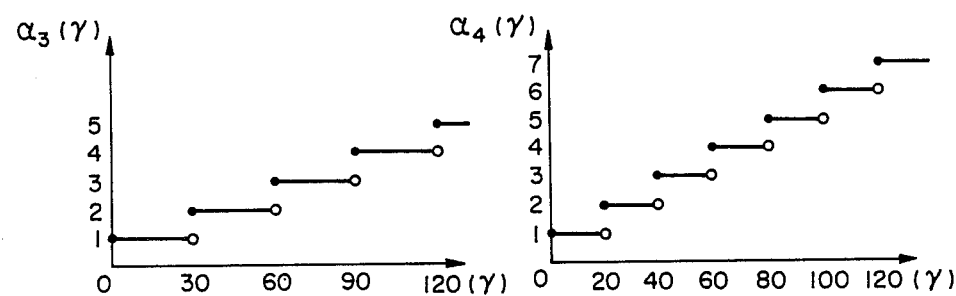
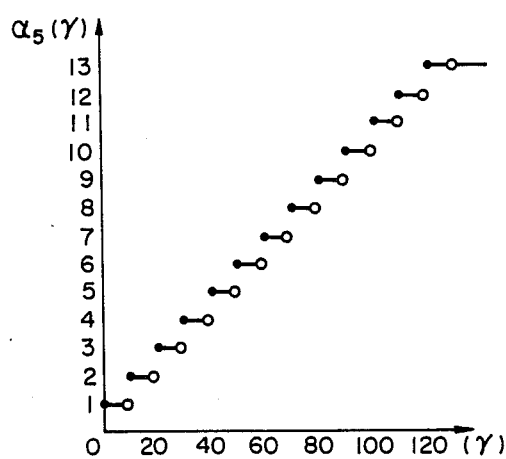

FIG. 12A

|   |    |   |
|---|----|---|
| 0 | -1 | 0 |
| -1 | 4 | -1 |
| 0 | -1 | 0 |

|    |   |    |
|----|---|----|
| -1 | 0 | -1 |
| 0  | 4 | 0  |
| -1 | 0 | -1 |

|   |   |    |   |    |
|---|---|----|---|----|
| 0 | 0 | -1 | 0 | 0  |
| 0 | 0 | 0  | 0 | 0  |
| -1 | 0 | 4 | 0 | -1 |
| 0 | 0 | 0  | 0 | 0  |
| 0 | 0 | -1 | 0 | 0  |

METHOD AND APPARATUS FOR IMAGE PROCESSING WITH FED-BACK ERROR CORRECTION

BACKGROUND OF THE INVENTION

1. Field of the Invention

The present invention relates to an image processing apparatus and method for processing an image by mean of digital signals and, more particularly, to an image processing apparatus and method for quantization processing concentration data of an image.

2. Related Background Art

What are called digital copying apparatuses in which, in general, an image is sampled by a CCD sensor or the like, the digitized data is output from a digital printer such as a laser beam printer or the like and the image is reproduced, are being widely used in place of the conventional analog copying apparatuses.

Such digital copying apparatuses generally use a system in which gradations are reproduced by a dither method or concentration pattern method to reproduce a half-tone. However, these methods have a following problems.

(1) In the case where an original is a mesh point image such as a print or the like, a periodic fringe pattern which does not exist on the original appears in the copied image.

(2) When an original includes graphic images, characters, and the like, their edges are reproduced like stairway images as a result of the dither process, so that the image quality deteriorates.

The above phenomenon, item (1) is called a moire phenomenon and the following points are considered as the causes for generation of such a phenomenon.

(A) Beats between frequencies of the mesh point original and the input sampling.

(B) Beats between frequencies of the mesh point original and the dither threshold value matrix.

Particularly, according to the phenomenon which is generated by the cause of (B), in general, when the threshold values of the dither are arranged as a dot concentration type, an output image also has a pseudo-mesh-point structure. Beats are generated by this pseudo-mesh-point structure and input mesh point original, so that the moire phenomenon occurs.

On the other hand, an error diffusion method or a least mean error method which is substantially the same as the error diffusion method is known as another binarizing method. According to this method, the concentration difference between the image concentration of an original and the output image concentration is arithmetically calculated for every pixel and the error amount so calculated is dispersed after special weights are added to the peripheral pixels. This method has been published in the reference by R. W. Floyd and L. Steinberg, "An Adaptive Algorithm for Spatial Gray Scale", SID 75 Digest, pages 36 and 37, 1975.

According to this method, since there is no periodicily, unlike the dither method, no moire is generated for the mesh point image. However, there are drawbacks, such that a special fringe pattern appears in the output image particle-like noises are conspicuous in the highlight and dark portions of the image, and the like.

To prevent the occurrence of such fringe pattern and particle-like noises, the region to disperse the error between the original image concentration and the output image concentration is changed in accordance with an edge quantum or an image concentration. This method has been disclosed in our commonly assigned U.S. application Ser. No. 07/137,439, filed Dec. 23, 1987.

SUMMARY OF THE INVENTION

It is an object of the present invention to eliminate the foregoing drawbacks in the conventional techniques and to provide an image processing apparatus and method which can obtain a reproduced image with a high fidelity from an original.

Another object of the invention is to improve the error diffusion method or least mean error method and to provide an image processing apparatus and method which can obtain a good reproduced image.

Still another object of the invention is to provide an image processing apparatus and method which can finely reproduce an image with a high quality irrespective of features of the image.

According to one aspect of the invention is provided an image processing apparatus in which the edge direction of an image is detected and the error generated when the image data was digitized is corrected in accordance with the edge direction.

According to another aspect of the invention is to provided image processing apparatus and method in which the weighting process is performed so as to obtain the error information from all of the error data existing in a predetermined range among the error data generated in execution of the digitization, and the ratio of the weighting process is changed in accordance with a feature of an image.

According to another aspect of the invention is to provided an image processing apparatus in which the edge direction and edge quantum of an image are detected and the image data is digitized in accordance with the edge direction and edge quantum.

The above and other objects and features of the present invention will become apparent from the following detailed description and the appended claims with reference to the accompanying drawings.

BRIEF DESCRIPTION OF THE DRAWINGS

FIG. 4 is a diagram showing an example of functions of the weight coefficients;

FIG. 6 is a diagram showing functions of the weight coefficients shown in FIG. 5C;

FIG. 7 is a diagram showing examples of the weight coefficients;

FIGS. 12A to 12C are diagrams showing examples of Laplacian operators;

DETAILED DESCRIPTION OF THE PREFERRED EMBODIMENTS

The preferred embodiments of the present invention will be described hereinbelow with reference to the drawings.

Figure 1:
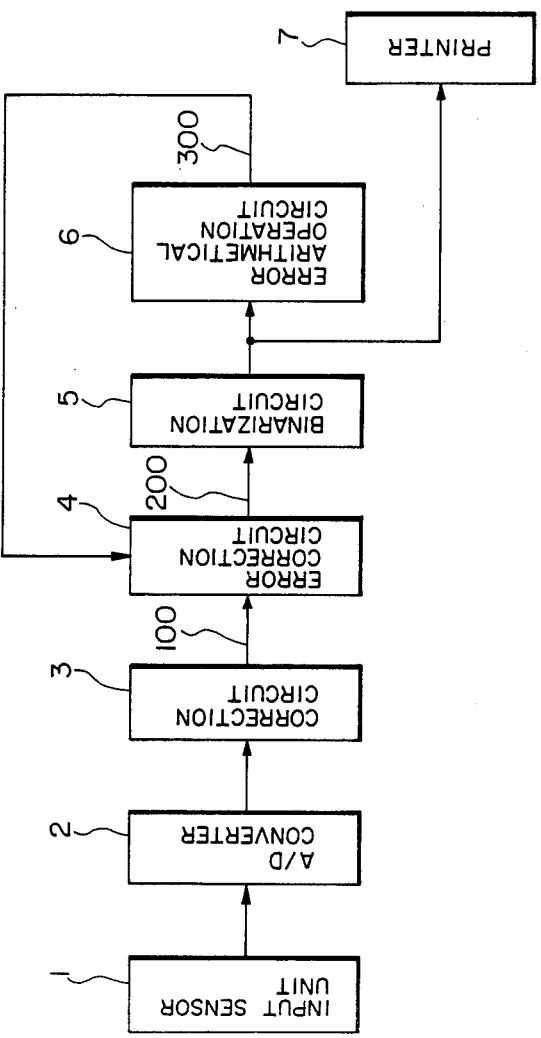
FIG. 1 is a block diagram of an image processing apparatus as the first preferred embodiment of the invention.

FIG. 1 is a block diagram of an image processing apparatus according to a first embodiment. An input sensor unit 1 has a photoelectric converting device such as a CCD or the like and a drive system to an original or the like using this device. Image data read out by the input sensor unit 1 is sequentially sent to an A/D converter 2. The A/D converter 2, for examples, converts the image data of each pixel into digital data of eight bits. Thus, the image data is digitized quantized to digital data having gradations of 256 levels. Next, the digital data is supplied to a correction circuit 3 and the corrections such as shading correction and the like to correct for a sensitivity variation of the sensor and an illuminance variation of an illuminating light source are performed by digital arithmetical operating processes.

Next, corrected image data 100 is sent to an error correction circuit 4 together with error data 300 which is output from an error arithmetical operation circuit 6. The error correction circuit 4 adds the image data 100 to the weighted error data 300. The added data is supplied as error correction data 200 to a binarization circuit 5 and compared with a threshold value T and binarized. For example, assuming that the error correction data 200 consists of eight bits, the threshold value T is set to 127. However, T may be set to another proper value. The binarized data is sent to a printer 7 and the error arithmetical operation circuit 6.

The error arithmetical operation circuit 6 calculates the difference between the data before the binarization and the binarized data and sends as the error data 300 to the error correction circuit 4. The binarized data is converted into an ON/OFF signal (dots) by the printer 7 and an image is formed.

Figure 2:
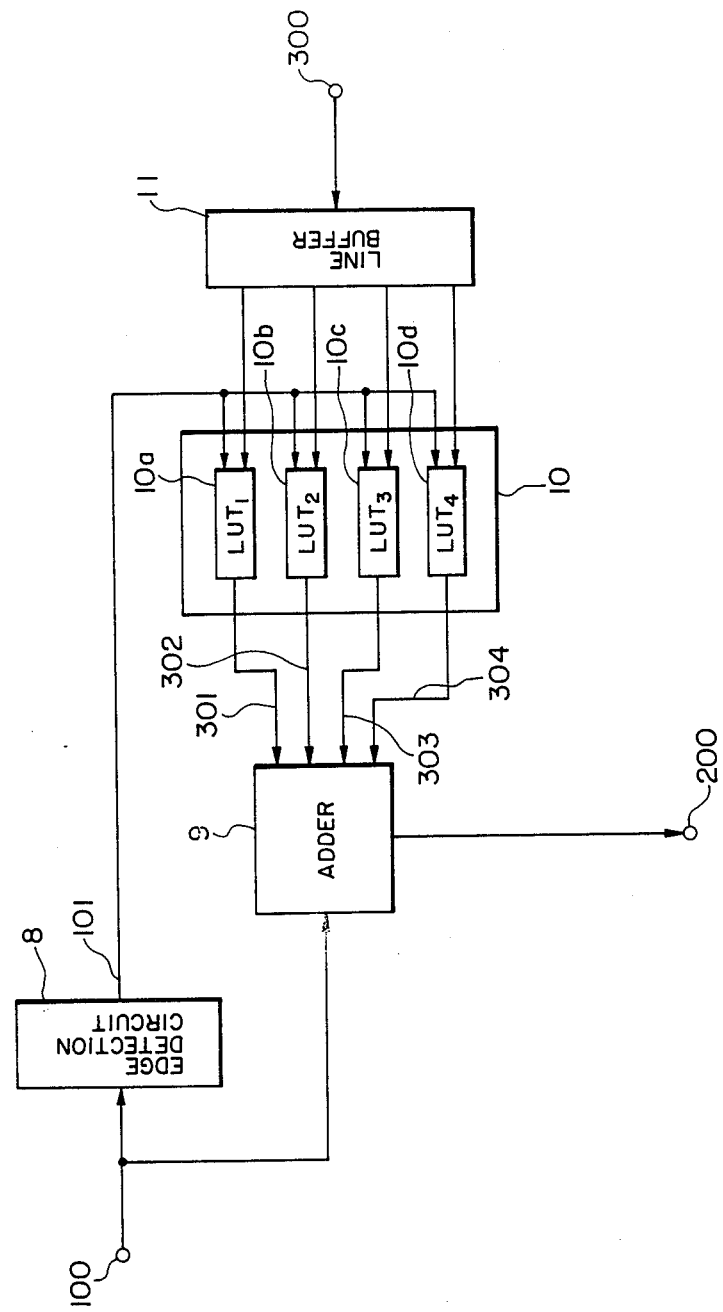
FIG. 2 is a block diagram showing an embodiment of an error correction circuit.

FIG. 2 is a block diagram showing an example of the error correction circuit 4. The image data 100 corrected by the correction circuit 3 is sent to an edge detection circuit 8 and an adder 9. An edge quantum is calculated by the edge detection circuit 8 and sent as edge quantum data 101 to a weight generator 10 in which weight coefficients are stored in correspondence to the edge quantum data 101. The weight generator 10 comprises look-up tables 10a to 10d. The adder 9 adds the image data 100 and error data 301–304 which are obtained by multiplying the weight coefficients read out of the look-up tables 10a to 10d by the error data 300. The adder 9 then outputs the results as error correction data 200, respectively.

The look-up tables 10a to 10d multiply the weight coefficients by the error data 300 output from a line buffer 11 in accordance with the edge quantum data 101, respectively.

The error data 300 is generated from the pixels which have already been binarized before a concerned pixel (i.e., the pixel currently under consideration). The error data 300 is equivalent to the difference between the concentration data of an image and the binarized output concentration data.

Figure 3A:
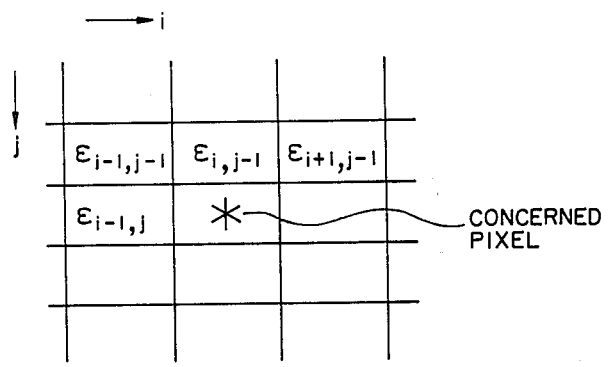
FIG. 3A is a diagram showing error data of four peripheral pixels of a concerned pixel.

FIG. 3A shows error data $\epsilon_{i,j}$ of four peripheral pixels of a concerned pixel. The error data $\epsilon_{i,j}$ is stored in the line buffer 11.

Figure 3B:
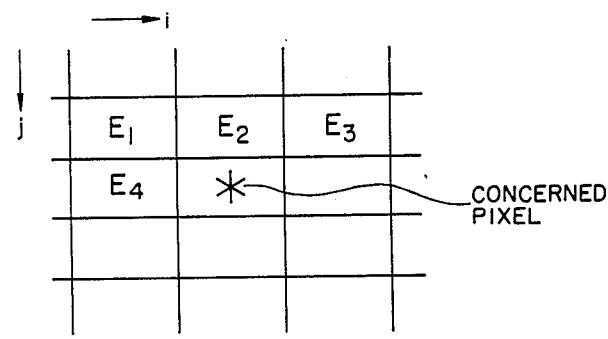
FIG. 3B is a diagram showing the weighted error data.

FIG. 3B shows error data obtained by multiplying the weight coefficients by the error data $\epsilon_{i,j}$ by the look-up tables 10a to 10d. $E_1$, $E_2$, $E_3$, and $E_4$ correspond to the error data 301, 302, 303, and 304 in FIG. 2, respectively.

Figure 3C:
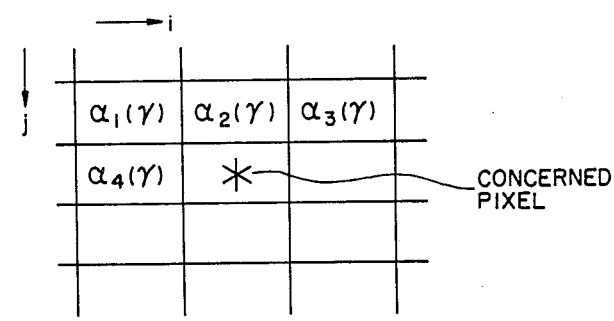
FIG. 3C is a diagram showing weight coefficients.

FIG. 3C shows the weight coefficients which are multiplied to the error data $\epsilon_{i,j}$ to obtain the weighted error data $E_1$ to $E_4$. $\gamma$ denotes an edge quantum which is output from the edge detection circuit 8. $\alpha_1(\gamma)$ to $\alpha_4(\gamma)$ represent weight coefficients in which the edge quantum is used as a parameter.

The error data $E_1$ to $E_4$ are obtained by the following equations:

$$E_1 = \{\alpha_1(\gamma)\cdot\epsilon_{i-1,j-1}\}/\beta$$

(output from the look-up table 10a)

$$E_2 = \{\alpha_2(\gamma)\cdot\epsilon_{i,j-1}\}/\beta$$

(output from the look-up table 10b)

$$E_3 = \{\alpha_3(\gamma)\cdot\epsilon_{i+1,j-1}\}/\beta$$

(output from the look-up table 10c)

$$E_4 = \{\alpha_4(\gamma)\cdot\epsilon_{i-1,j-1}\}/\beta$$

(output from the look-up table 10d)

wherein $$\beta = \sum_{m=1}^{4} \alpha_m(\gamma)$$

$\beta$ denotes the sum of the weight coefficients $\alpha_m(\gamma)$ (m=1, 2, 3, 4). By dividing by $\beta$, the sum of the weight coefficients is made substantially equal to 1.

The weight coefficients $\alpha_m(\gamma)$ are expressed by the following equations. FIG. 4 shows the functions of $\alpha_m(\gamma)$ when the edge quantum $\gamma$ is used as a parameter.

$$\alpha_1(\gamma) = \alpha_3(\gamma) = 1$$

$$\alpha_2(\gamma) = \alpha_4(\gamma) = [(\gamma/3\ 0)+1]$$

where [ ] denotes the Gaussian integer function and indicates the maximum integer which does not exceed the value in this symbol.

Namely, as will be understood from a graph in FIG. 4, $\alpha_1(\gamma)$ and $\alpha_3(\gamma)$ are always "1" irrespective of the edge quantum $\gamma$ and $\gamma_2(\gamma)$ and $\gamma_4(\gamma)$ increase with an increase in edge quantum. In other words, in this embodiment, as the edge quantum becomes larger, larger weights are added to the errors $\epsilon_{i,j-1}$ and $\epsilon_{i,j-1}$ generated from the pixels near the concerned pixel.

Thus, the resolutions of the character portions of an image and of the edge portions of a graphic pattern can be raised. This is because, by increasing the ratio of the error data from the pixels near the concerned pixel, the concentration of the image can be preserved within a narrow range and the spatial frequency can be raised. On the other hand, when an image suddenly changes from white to black (i.e., from low concentration to high concentration of the image), the edge quantum increases and at this time, the probability that the error data ($\epsilon_{i,j-1}$ and $\epsilon_{i-1,j}$) of the pixels near the concerned pixel are positive is high. Therefore, by increasing the ratio of the error data from the pixels near the concerned pixel, the concentration of the concerned pixel can be raised.

On the contrary, when an image suddenly changes from black to white, since the probability that the error data ($\epsilon_{i,j-1}$ and $\epsilon_{i-1,j}$) of the pixels near the concerned pixel are negative is high, by increasing the ratio of the error data from the pixels near the concerned pixel, the concentration of the concerned pixel can be reduced.

Although the errors have been described above as being calculated from four peripheral pixels of the concerned pixel in this example, by increasing the number of look-up tables, many errors from n peripheral pixels of the concerned pixel can be considered. On the other hand, different kinds of weight functions $\alpha_m(\gamma)$ can be also used, and the invention is not limited to the foregoing embodiment.

An explanation will now be made hereinbelow with respect to the case where the error data from twelve peripheral pixels of a concerned pixel are weighted and added to the concentration data of the concerned pixel.

Figure 5A:
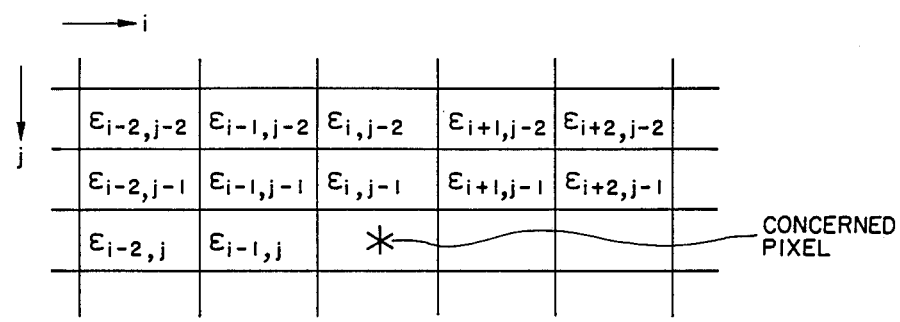
FIG. 5A is a diagram showing error data of twelve peripheral pixels of a concerned pixel.

FIG. 5A is a diagram showing the error data $\epsilon_{i,j}$ generated from the 12 peripheral pixels of the concerned pixel.

Figure 5B:
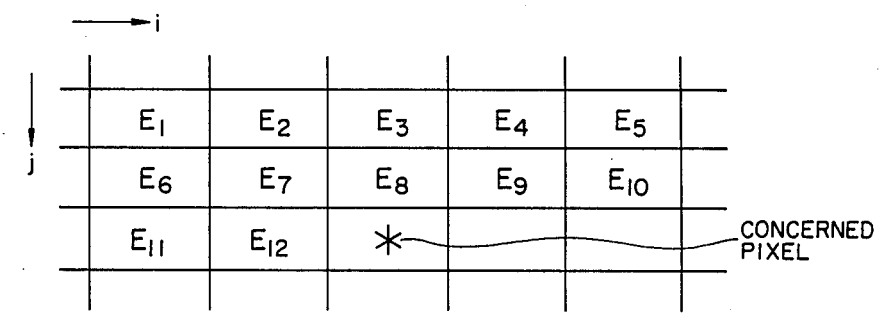
FIG. 5B is a diagram showing the weighted error data.

FIG. 5B is a diagram showing the error data $E_1$ to $E_{12}$ which are derived by multiplying the weight coefficients to the error data $\epsilon_{i,j}$.

Figure 5C:
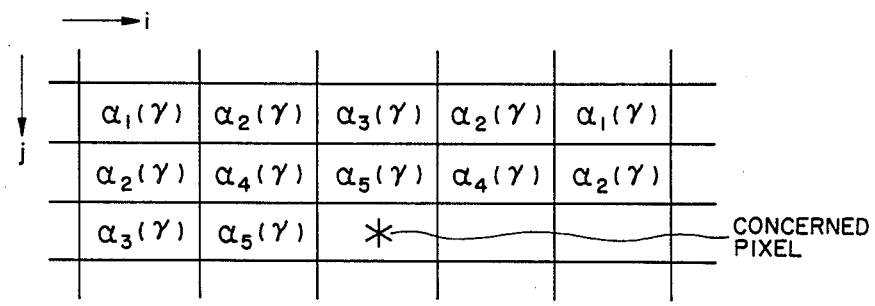
FIG. 5C is a diagram showing weight coefficients.

FIG. 5C is a diagram showing the weight coefficients $\alpha_1(\gamma)$ to $\alpha_5(\gamma)$. $\alpha_1(\gamma)$ to $\alpha_5(\gamma)$ are the functions in which the edge quantum is used as a parameter. FIG. 6 shows the functions of $\alpha_1(\gamma)$ to $\alpha_5(\gamma)$.

The error data $E_1$ to $E_{12}$ are obtained by the following equations:

$$E_1 = \{\alpha_1(\gamma) \cdot \epsilon_{i-2,j-2}\}/\beta$$
$$E_2 = \{\alpha_2(\gamma) \cdot \epsilon_{i-1,j-2}\}/\beta$$
$$E_3 = \{\alpha_3(\gamma) \cdot \epsilon_{i,j-2}\}/\beta$$
$$E_4 = \{\alpha_2(\gamma) \cdot \epsilon_{i+1,j-2}\}/\beta$$
$$E_5 = \{\alpha_1(\gamma) \cdot \epsilon_{i+2,j-2}\}/\beta$$
$$E_6 = \{\alpha_2(\gamma) \cdot \epsilon_{i-2,j-1}\}/\beta$$
$$E_7 = \{\alpha_4(\gamma) \cdot \epsilon_{i-1,j-1}\}/\beta$$
$$E_8 = \{\alpha_5(\gamma) \cdot \epsilon_{i,j-1}\}/\beta$$
$$E_9 = \{\alpha_4(\gamma) \cdot \epsilon_{i+1,j-1}\}/\beta$$
$$E_{10} = \{\alpha_2(\gamma) \cdot \epsilon_{i+2,j-1}\}/\beta$$
$$E_{11} = \{\alpha_3(\gamma) \cdot \epsilon_{i-2,j}\}/\beta$$
$$E_{12} = \{\alpha_5(\gamma) \cdot \epsilon_{i-1,j}\}/\beta$$

where
$$\beta = 2\alpha_1(\gamma) + 2\alpha_4(\gamma) + 2\alpha_3(\gamma) + 4\alpha_2(\gamma) + 2\alpha_5(\gamma)$$

$\alpha_1(\gamma)$ to $\alpha_5(\gamma)$ shown in FIG. 6 are expressed by the following equations:

(i) When $0 \leq \gamma > 120$, $$\alpha_1(\gamma) = 1$$
$$\alpha_2(\gamma) = [(\gamma/40) + 1]$$
$$\alpha_3(\gamma) = [(\gamma/30) + 1]$$
$$\alpha_4(\gamma) = [(\gamma/20) + 1]$$
$$\alpha_5(\gamma) = [(\gamma/10) + 1]$$

(ii) When $\gamma \geq 120$, $$\alpha_1 1, \alpha_2 = 4, \alpha_3 = 5, \alpha_4 = 7, \alpha_5 = 13$$

From the above equations and the graph of FIG. 6, the weight coefficients $\alpha_1(\gamma)$ to $\alpha_5(\gamma)$ in the cases where the edge quantum is 10 and where it is 120 are now compared.

FIG. 7 shows the weight coefficients when the edge quantums are 10 and 120.

It will be understood from FIG. 7 that as the edge quantum is large, larger weights are added to the pixels near the concerned pixel and when the edge quantum is small, weights are relatively uniformly added to the error data from a wide range.

Therefore, the resolutions of the edge portions can be raised and the edges can be sharply reproduced. In the portion having a small edge quantum such as in the highlight portion or shadow portion of an image, the image data is processed using the error data obtained from a wide range. Therefore, a smooth image with little noise component can be reproduced.

On the other hand, since the weight coefficients of the errors change in accordance with the edge quantum, when the weight coefficients are equal, a special fringe pattern which is generated due to the occurrence of the periodic structure can be prevented.

Further, even if the ratio of the weights changes, the region to which errors are referred (the region where the errors are dispersed) does not change, so that a change in quality of the reproduced image due to a change in region can be also prevented.

The edge detection circuit 8 in FIG. 1 will now be described in detail hereinbelow.

Figure 8:
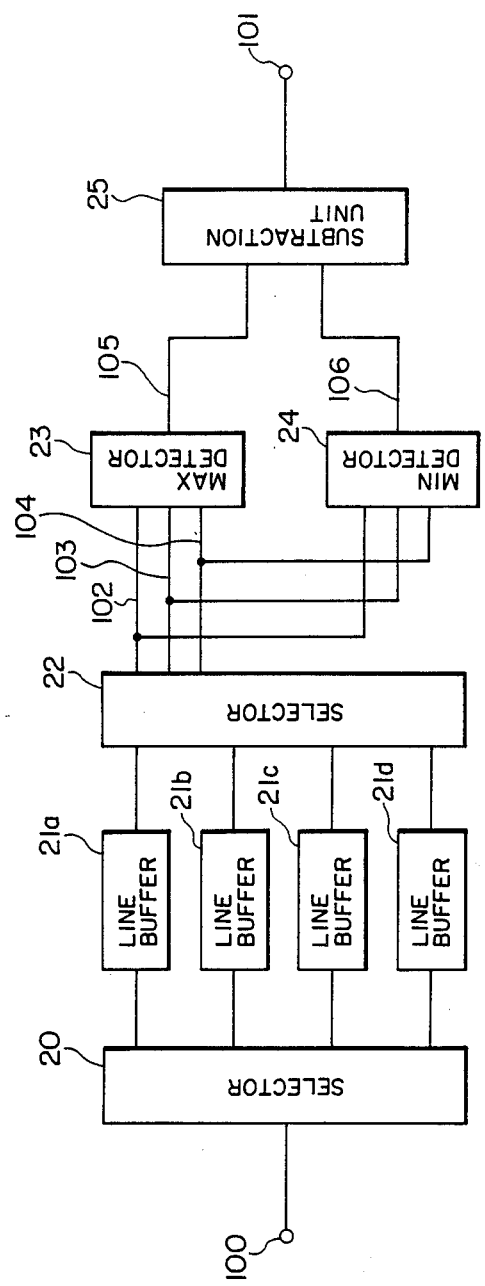
FIG. 8 is a block diagram showing an embodiment of an edge detection circuit.

FIG. 8 is a block diagram showing an example of the edge detection circuit 8. One of line buffer memories 21a to 21d which is selected by a selector is in the writing mode and the three remaining memories are in the reading mode. After the image data 100 is written into the first line buffer 21a, the next data is written into the second line buffer 21b. The subsequent data are sequentially written into the third and fourth line buffers 21c and 21d. After the data has been written into the fourth line buffer 21d, the data is again written into the first line buffer 21a.

Thus, the data of the three continuous lines before the line data of the image which is at present being written are recorded into the line buffers 21a to 21d and these data are selected by a selector 22 and read out. The line data are then sent to a maximum value detection circuit 23 and a minimum value detection circuit 24. Although FIG. 8 shows the case where the four line buffers 21a to 21d are used. However, for example, six line buffers can be also used.

The maximum value detection circuit 23 detects the maximum value from the line data. The minimum value detection circuit 24 detects the minimum value from the line data. The maximum and minimum values are sent to a subtraction unit 25 and the edge quantum 101 is calculated.

Figure 9:
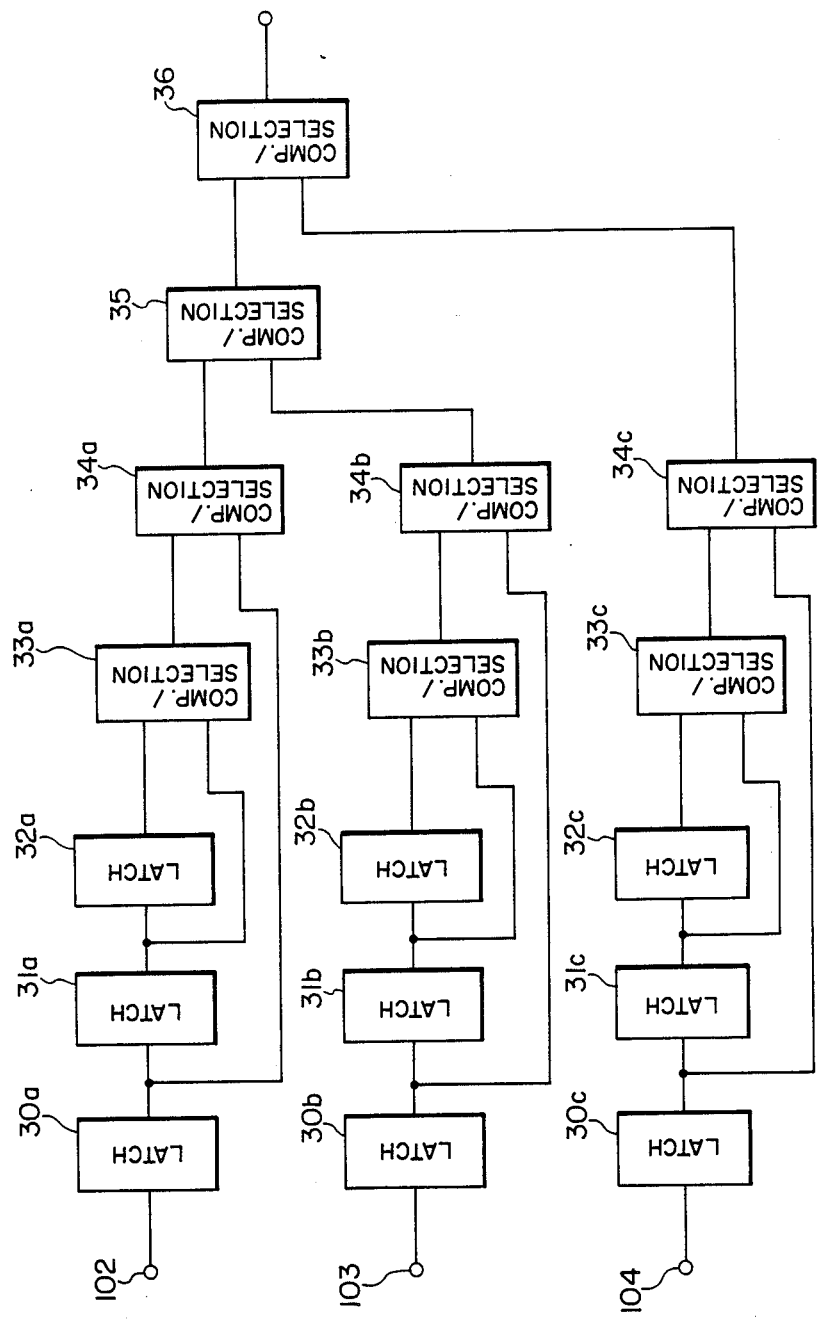
FIG. 9 is a block diagram of a maximum value of minimum value detection circuit.

FIG. 9 is a block diagram of an example of the maximum and minimum value detection circuits 23 and 24. Image data 102, 103, and 104 of the lines selected by the selector 22 are delayed by one pixel at a time by latches 30a to 30c, 31a to 31c, and 32a to 32c, respectively.

A comparison/selection unit 33a compares outputs of the latches 31a and 32a, namely, compares the data of one pixel and the data of the immediately-preceding pixel. Similarly, a comparison/selection unit 34a compares the result of the output of the unit 33a with the data of the second-preceding pixel. Therefore, an output of the unit 34a corresponds to the maximum or minimum value among three continuous pixels of one line.

Figure 10:
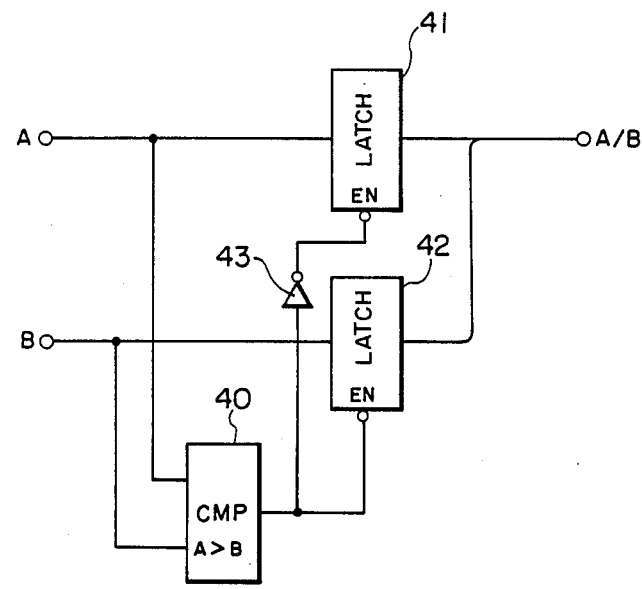
FIG. 10 is a block diagram of a comparison/selection unit.

FIG. 10 shows an example of a construction of the comparison/selection units in the maximum value detector 23. Inputs A and B are respectively connected to a comparator 40 and latches 41 and 42. Assuming that an output of the comparator 40 is set to "1" when A>B, the output of the comparator 40 is set to "1" when the data A is larger than the data B. This "1" signal is inverted by an inverter 43 and supplied to an enable terminal EN of the latch 41. Assuming that the latches 41 and 42 use the negative logic, an output 45 is set to the value of A. On the contrary, when A is equal to or smaller than B, the output 45 is set to the value of B. Namely, the larger one of the value of A and B is output as the output 45.

On the other hand, the minimum value detector 24 can be easily realized by providing the inverter 43 before the latch 42.

A comparison/selection unit 35 detects the maximum or minimum value of the first and second lines. A comparison/selection unit 36 detects the maximum or minimum value of the output data of the unit 35 and the data of the third line.

Thus, an output of the unit 36 is set to the maximum or minimum value in the block of $3 \times 3$ pixels.

Figure 11:
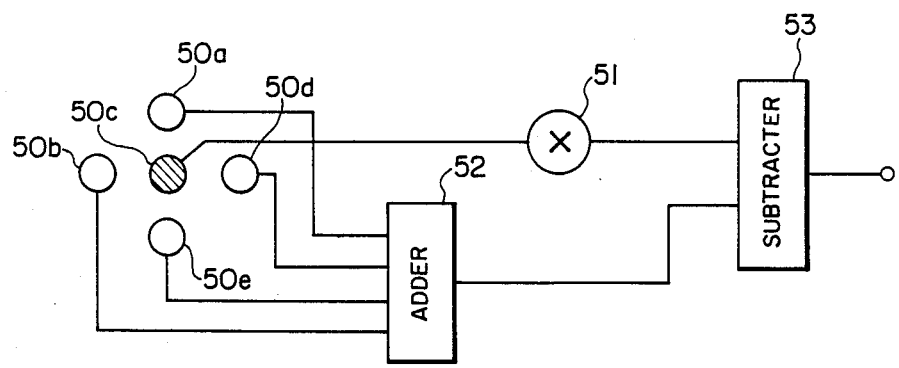
FIG. 11 is a block diagram of another embodiment of an edge detection circuit.

FIG. 11 is a block diagram of another embodiment to obtain the edge detection output 101. In the data of three lines from the selector 22, the central pixel is indicated by 50c and the peripheral pixels assume by 50a, 50b, 50d, and 50e. The central pixel is multiplied with a certain constant by a multiplier 51 and the result is input to a subtractor 53. On the other hand, the sum of the peripheral pixels is calculated by an adder 52 and input to the subtractor 53.

Thus, the output of the subtractor 53 is expressed by $$\text{output} = \text{constant} \times (50c) - \{(50a) + (50b) + (50d) + (50e)\}$$

This equation corresponds to the Laplacian operation shown in FIG. 12A (where the constant=5). The Laplacian operation is not limited to this but those shown in FIGS. 12B and 12C can be also used.

Figure 13:
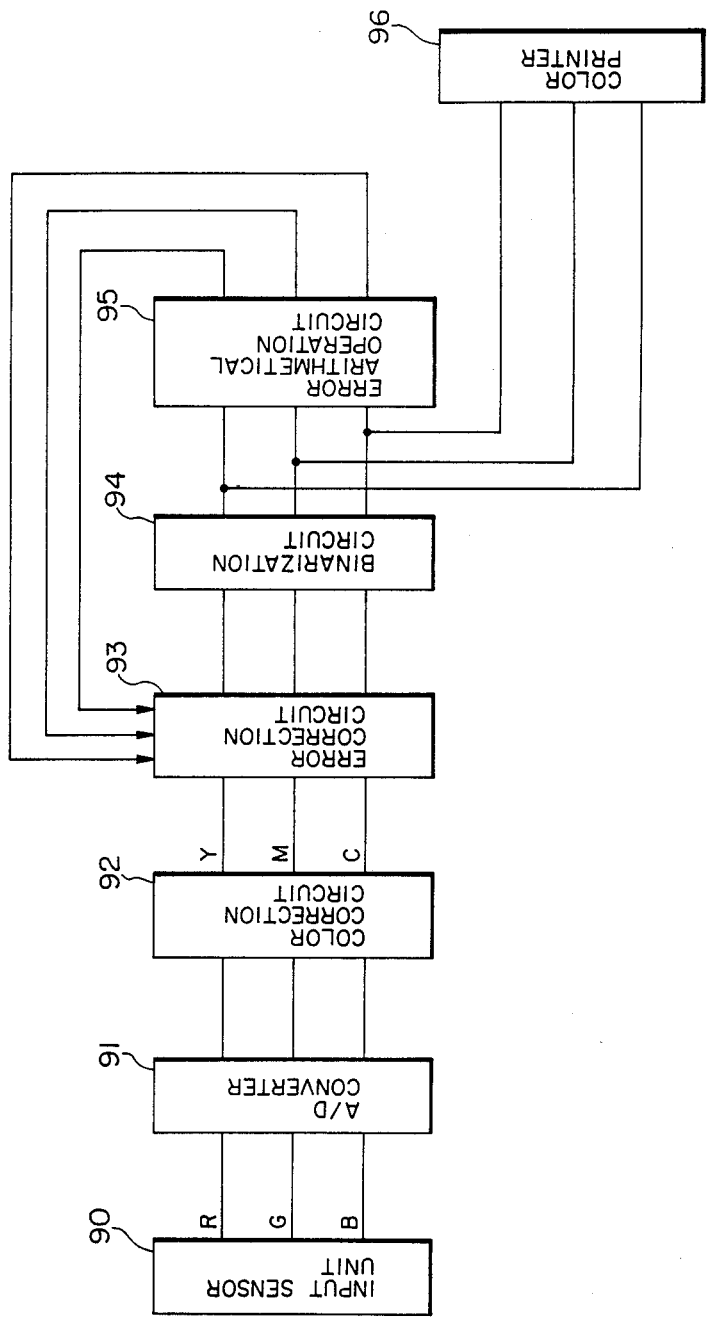
FIG. 13 is a block diagram showing an embodiment of a color image forming apparatus.

FIG. 13 is a block diagram showing an example in the case where the embodiment is applied to a color image. Three color separated red (R), green (G), and blue (B) signals are output from a color image input sensor unit 90. These signals are converted into the digital signals each consisting of eight bits by an A/D converter 91 and supplied to a color correction circuit 92. The shading correction, complementary color conversion from the RGB signals to the YMC signals, and masking process are executed to the digital signals by the correction circuit 92, so that the yellow (Y), magenta (M), and cyan (C) signals are output.

The Y, M, and C signals are input to an error correction circuit 93. The error correction circuit 93, a binarization circuit 94, and an error arithmetical operation circuit 95 can be realized by providing the foregoing circuits in correspondence to those three colors, respectively.

As explained above, by changing the distribution ratio of the errors in accordance with the edge quantum, the edge portion can be sharply reproduced, particle-like noise in the uniform concentration portion (shadow portion or highlight portion) can be reduced, and a smooth image can be reproduced. On the other hand, the generation of a special fringe pattern can be also eliminated.

Further, since the distribution region of the errors is constant, a change in image quality can also be prevented.

As will be obvious from FIG. 6, since the gradient of the weight coefficients to the edge quantum is increased as the pixels approach the concerned pixel as close as possible, the correction can be more finely performed in accordance with the edge quantum for the pixels near the concerned pixel and a reproduced image can be obtained from an original with high fidelity.

The process in consideration of the edge direction will now be explained as the second embodiment.

Figure 14:
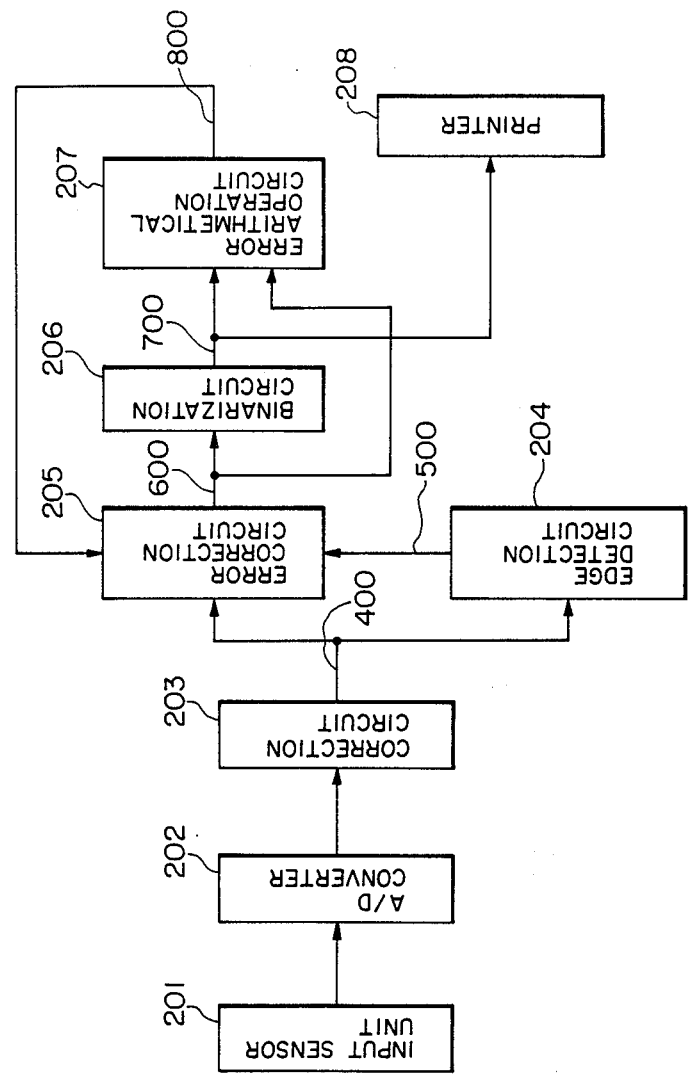
FIG. 14 is a block diagram showing the second embodiment of the invention.

FIG. 14 is a block diagram showing the second embodiment of the invention. An input sensor unit 201 comprises a photoelectric converting device such as a CCD or the like and a drive system to scan this device and scans to read an original. The image data of the original read by the input sensor unit 201 is sequentially sent to an A/D converter 202. The A/D converter 202 converts the data of each pixel into the digital data of eight bits. Namely, the A/D converter 202 digitizes the image data into the data having the gradations of 256 levels. The digital data is supplied to a correction circuit 203. The correction circuit 203 executes the digital arithmetical operating processes such as a shading correction and the like to correct a variation in sensitivity of the CCD sensor and a variation in illuminance due to the illuminating light source. Next, corrected data 400 is supplied to an error correction circuit 205 and an edge detection circuit 204.

The edge detection circuit 204 calculates the edge direction and edge quantum and sends these edge data 500 to the error correction circuit 205. In the error correction circuit 205, error data 800 which is supplied from an error arithmetical operation circuit 207 is weighted by the edge data 500 from the edge detection circuit 204, and the weighted data is then added to the corrected data 400 from the correction circuit 203, and resultant error correction data 600 is supplied to a binarization circuit 206. The binarization circuit 206 binarizes the error correction data 600 using the threshold value T (e.g., T=127). The resultant data is supplied as binary data 700 to a printer 208 and the error arithmetical operation circuit 207. The error arithmetical operation circuit 207 calculates the difference between the error correction data 600 and the binary data 700 corresponding thereto and returns the error data 800 to the error correction circuit 205. The printer 208 turns on or off the dots in accordance with the binary data 700, thereby printing.

Figure 15:
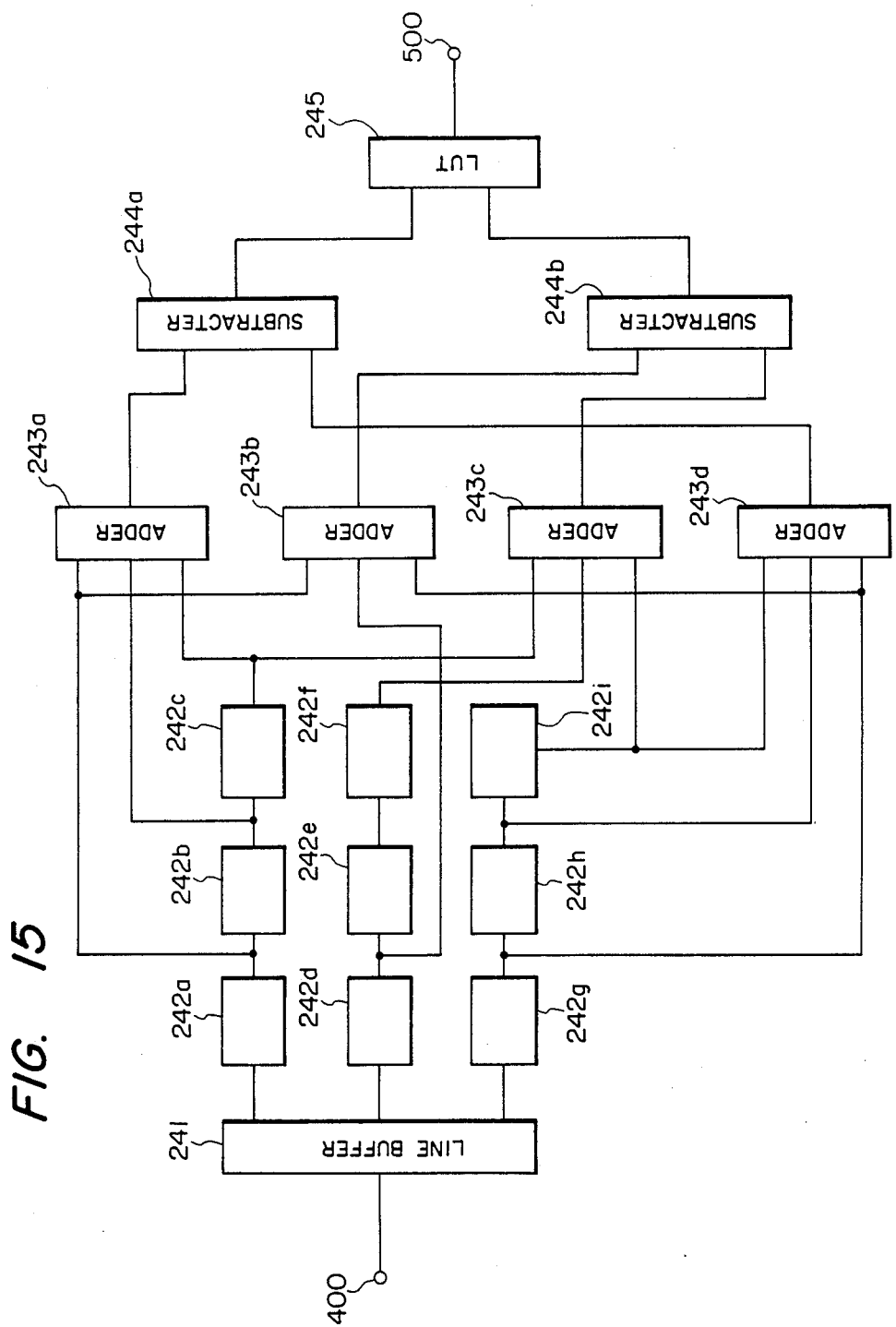
FIG. 15 is a block diagram of an edge detection circuit.

FIG. 15 is a block diagram showing the details of the edge detection circuit 204 in FIG. 14. The corrected data 400 from the correction circuit 203 is input to a line buffer 241. Reference numerals 242a to 242i indicate nine pixels among the data of three lines which are output from the line buffers. It is now assumed that the central pixel is indicated at 242e and the peripheral pixels are represented at 242a to 242d and 242f to 242i. In this case, the data of the pixels 242a, 242b, and 242c are input to an adder 243a. Similarly, the data of the pixels 242a, 242d, and 242g are input to an adder 243b; the data of the pixels 242c, 242f, and 242i are input to an adder 243c; and the data of the pixels 242g, 242h, and 242i are input to an adder 243d. The data from the adders 243a and 243d are input to a subtractor 244a. The data from the adders 243b and 243c are input to a subtractor 244b. The edge direction and edge size are output from the substractor 244a. The edge direction denotes whether the edge exists in the direction of the pixel 242b or the pixel 242h when it is seen from the central pixel 242e. On the other hand, the edge direction and edge size are output from the subtractor 244b. In this case, the edge direction represents whether the edge exists in the direction of the pixel 242d or 242f, as seen from the central pixel 242e. The signals indicative of the edge directions and edge sizes which are output from the subtractors 244a and 244b are input to a look-up table (LUT) 245. The LUT 245 decides the error distribution ratio from the input signals and outputs as the edge data 500. For example, it is now assumed that the data indicating that the edge direction is the direction from the central pixel 242e to the pixel 242b and the edge size is $\alpha_1$ was input from the subtractor 244a to the LUT 245. Or, it is assumed that the data indicating that the edge direction is the direction from the central pixel 242e to the pixel 242d and the edge size is $\beta_1$ was input from the subtractor 244b to the LUT 245. In this case, the error distribution ratios are as shown below for the error data stored in error buffer memories 231a to 231i in FIG. 16.

Distribution ratio for 231a ... $[(\alpha_1 + \beta_1)/2]$
Distribution ratio for 231b ... $\alpha_1$
Distribution ratio for 231c ... $[(\alpha_1 + \beta_1)/4]$
Distribution ratio for 231d ... $\beta_1$ The difference between the error correction data 600 and the corresponding binary data 700 are stored in the error buffer memories 231a to 231d shown in FIG. 16, respectively. The data corresponding to the concerned pixel which is at present being processed is stored in the memory 231e. No data is stored in the memories 231f to 231i since data is not processed yet.

As the processes are executed, the contents of the error buffer memories are sequentially shifted.

It is assumed that the data indicating that the edge direction is the direction from the central pixel 242e to the pixel 242b and the edge size is $\alpha_2$ was input from the subtractor 244a to the LUT 245. Or, it is assumed that the data representing that the edge direction is the direction from the central pixel 242e to the pixel 242f and the edge size is $\alpha_2$ was input from the subtractor 224b to the LUT 245. In this case, the error distribution ratios are as shown below.

Distribution ratio for 231a ... $[(\alpha_2 + \beta_2)/3]$
Distribution ratio for 231b ... $\alpha_2$
Distribution ratio for 231c ... $[(\alpha_2 + \beta_2)/2]$
Distribution ratio for 231d ... $[(\alpha_2 + \beta_2)/3]$ On the other hand, it is assumed that the data indicating that the edge direction is the direction from the central pixel 242e to the pixel 242h and the edge size is $\alpha_3$ was input from the subtractor 244a to the LUT 245. Or, it is assumed that the data representing that the edge direction is the direction from the central pixel 242e to the pixel 242d and the edge size is $\beta_3$ was input from the subtractor 244b to the LUT 245. In this case, the error distribution ratios are as follows.

Distribution ratio for 231a ... $[(\alpha_3 + \beta_3)/4]$
Distribution ratio for 231b ... $[(\alpha_3 + \beta_3)/3]$
Distribution ratio for 231c ... $[(\alpha_3 + \beta_3)/5]$
Distribution ratio for 231d ... $\max(\alpha_3, \beta_3)$ On the other hand, it is assumed that the data indicating that the edge direction is the direction from the central pixel 242e to the pixel 242h and the edge size is $\alpha_4$ was input from the subtractor 244a to the LUT 245. Or, it is assumed that the data representing that the edge direction is the direction from the central pixel 242e to the pixel 242f and the edge size is $\beta_4$ was input from the subtractor 244b to the LUT 245. In this case, the error distribution ratios are as follows Distribution ratio for 231a ... $[(\alpha_4 + \beta_4)/3]$
Distribution ratio for 231b ... $[(\alpha_4 + \beta_4)/2]$
Distribution ratio for 231c ... $\beta_4$
Distribution ratio for 231d ... $\alpha_4$ The distribution ratios for the error buffer memories 213a, 231b, 231c, and 231d are divided by the sum of those distribution ratios such that the sum of them is equal to "1".

The foregoing error distribution ratios relate to the case where the error distribution is executed with respect to only four peripheral pixels which were processed. However, as explained in the first embodiment, the number of pixels processed can be widely set, e.g., to twelve peripheral pixels. On the other hand, only an example of the distribution ratios has been shown here. It is also possible to detect only the edge direction by the foregoing method and to preset the error distribution ratios for the error buffer memories 231a to 231d in accordance with the edge direction.

When no edge exists, all of the distribution ratios are set to 1.

Figure 16:
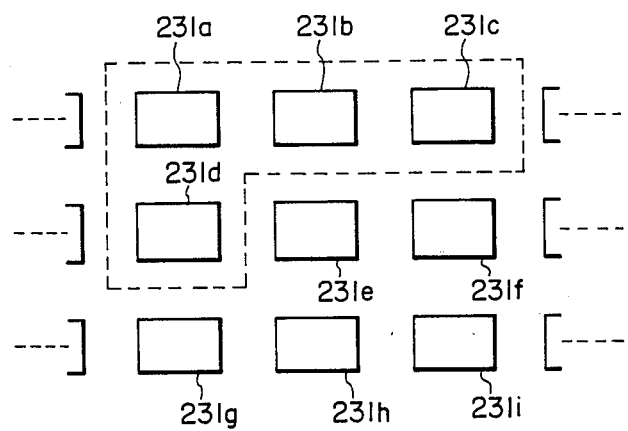
FIG. 16 is a diagram showing an error-buffer memory.
Figure 17:
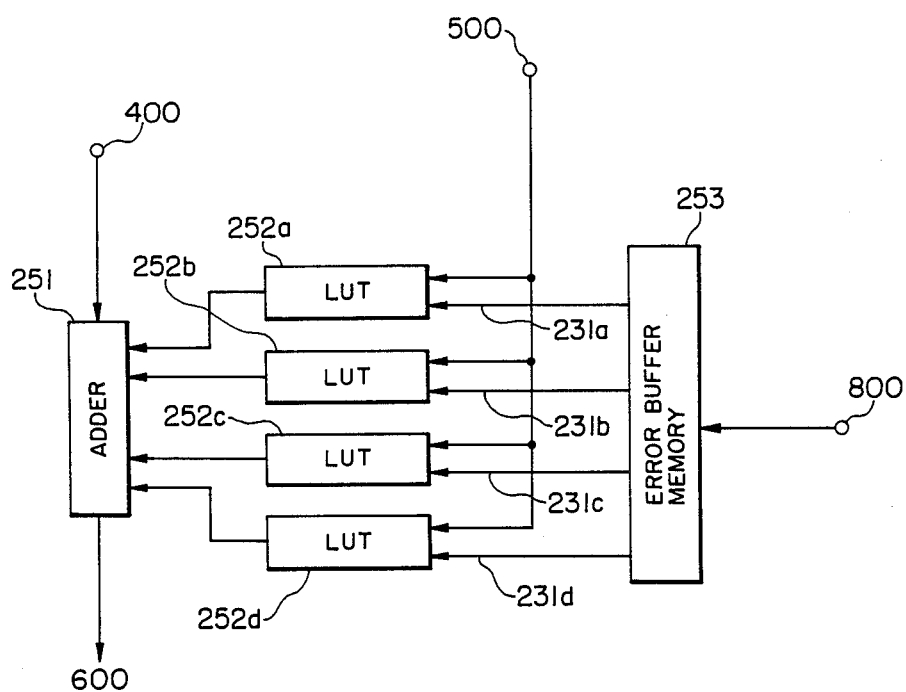
FIG. 17 is a block diagram of an error correction circuit.

FIG. 17 is a block diagram showing the details of the error correction circuit 205 in FIG. 14. An error buffer memory 253 is the same as that shown in FIG. 16. The error data 800 which is output from the error arithmetical operation circuit 207 is stored in the memory 253.

In FIG. 16, when the image data 400 corresponding to the error buffer memory 231e is being processed, the error data 231a, 231b, 231c, and 231d of the four peripheral pixels are stored into LUTs 252a to 252d, respectively.

The edge data 500 which is output from the edge detection circuit 204 is input to the LUTs 252a to 252d, by which the data stored in the error buffer memories 231a to 231d are weighted.

The error data weighted by the LUTs 252a to 252d are sent to an adder 251 and added to the image data 400 corrected by the correction circuit 203. The resultant data are output as the error correction data 600 to the binarization circuit 206.

Figure 18:
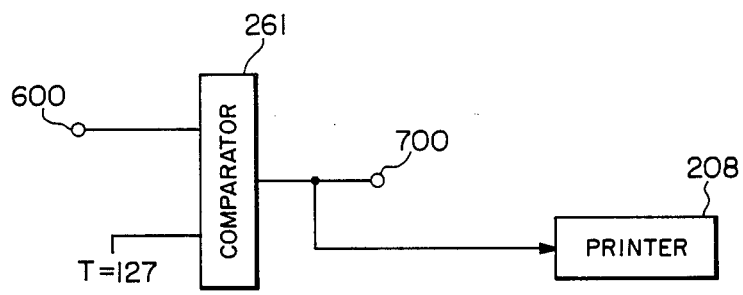
FIG. 18 is a block diagram of a binarization circuit.

FIG. 18 is a block diagram showing the binarization circuit 206. If the error correction data 600 input to a comparator 261 is larger than the threshold value T=127, it is binarized to "255". If the data 600 is smaller than T=127, it is binarized to "0". The resultant binary signal 700 is sent to the error arithmetical operation circuit 207 and printer 208.

Figure 19:
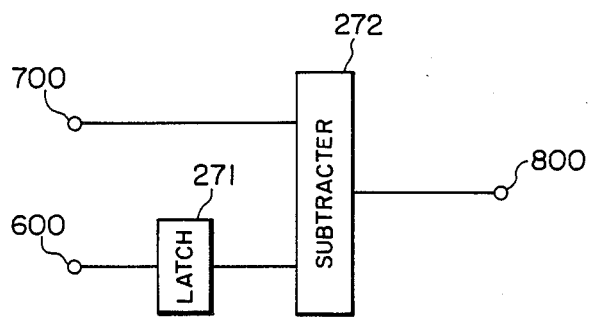
FIG. 19 is a block diagram of an error arithmetical operation circuit.

FIG. 19 is a block diagram showing the error arithmetical operation circuit 207. The error correction data 600 is input to a latch 271. A subtractor 272 calculates the difference between the error correction data 600 and the binary data 700. This difference is output as the error data 800.

Figure 20:
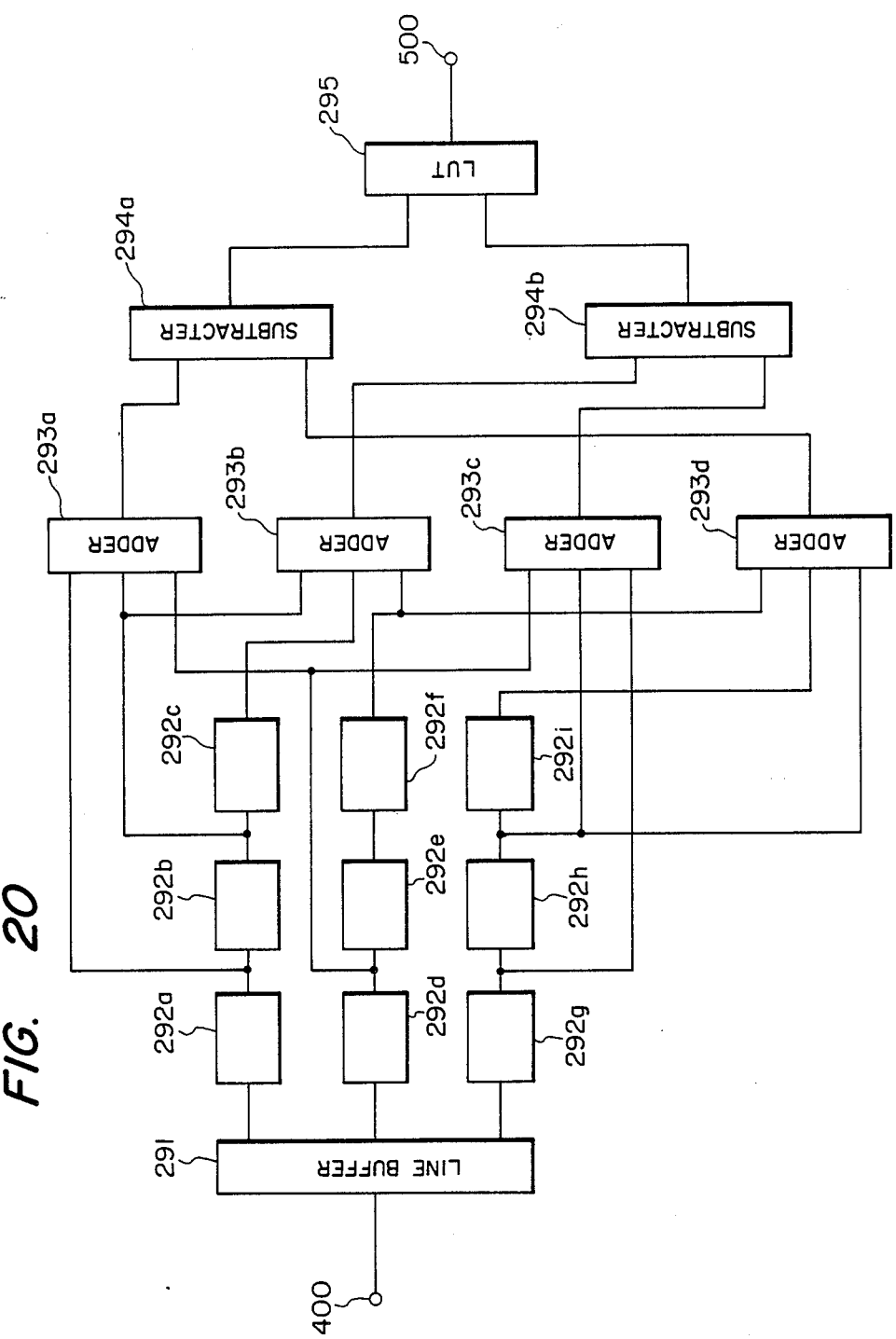
FIG. 20 is a block diagram showing another embodiment of an edge detection circuit.

FIG. 20 is a block diagram in the case where a part of the edge detection circuit 204 in the embodiment is changed. FIG. 20 differs from FIG. 15 with respect to the following points. The data of pixels 292a, 292b, and 292d are input to an adder 293a. The data of pixels 292b, 292c, and 292f are input to an adder 293b. The data of pixels 292d, 292g, and 292h are input to an adder 293c. The data of pixels 292f, 292h, and 292i are input to an adder 293d. Thus, the edges existing in the directions from a central pixel 292e to the pixels 292a, 292c, and 292g, and 292i can be detected.

Figure 21:
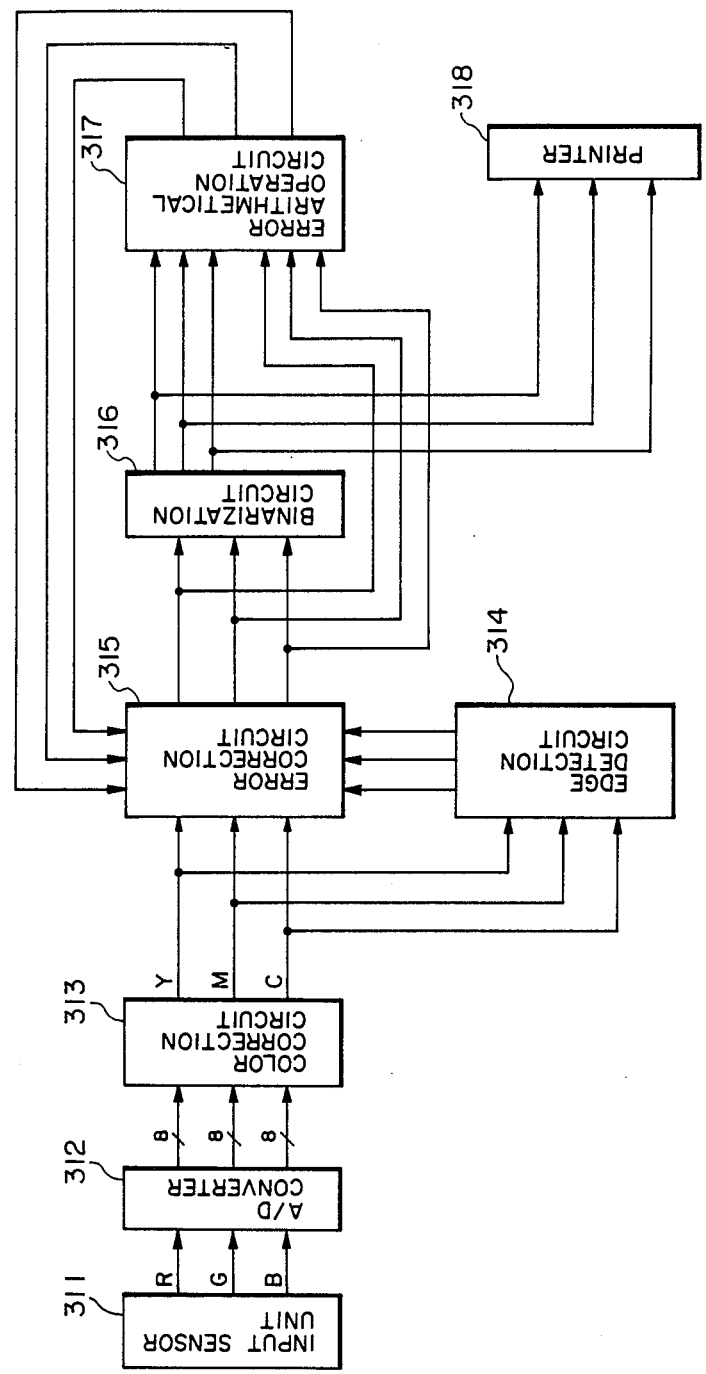
FIG. 21 is a block diagram showing the case where the second embodiment is applied to a color image.

FIG. 21 is a block diagram in the case where the foregoing embodiment is applied to a color image. The color separated red (R), green (G), and blue (B) signals are output from a color image input sensor unit 311 and converted into the digital signals each consisting of eight bits by an A/D converter 312. The digital signals are supplied to a color correction circuit 313. The color correction circuit 313 executes the color processes such as shading correction, complementary color conversion from the RGB signals to the YMC signals, and masking process. Thus, yellow (Y), magenta (M), and cyan (C) signals are output from the color correction circuit 313.

An edge detection circuit 314 calculates the edge directions and edge sizes from the Y, M, and C signals output from the color correction circuit 313, respectively. An error correction circuit 315 executes the error correction of three colors on the basis of the Y, M, and C signals output from the color correction circuit 313, the edge quantum signals of three colors which are output from the edge detection circuit 314, and the error data of three colors which are output from an error arithmetical operation circuit 317. A binarization circuit 316 binarizes the error correction data of three colors which are output from the error correction circuit 315 by the threshold value of T=127, respectively.

The error arithmetical operation circuit 317 calculates the differences between the binary signals of three colors which are output from the binarization circuit 316 and the error correction data of three colors which are output from the error correction circuit 315, respectively.

The edge detection circuit 314, error correction circuit 315, binarization circuit 316, and error arithmetical operation circuit 317 can be easily realized by providing the circuits 204, 205, 206, and 207 in the foregoing embodiment for three colors, respectively.

As explained above, according to the second embodiment, since the weight coefficients of the errors are changed in accordance with the edge existing directions and edge quantums by providing the edge detection circuit, a special fringe pattern can be eliminated and the edge emphasizing effect can be obtained.

As explained above, with the present invention, there is an effect such that any image can be highly finely reproduced at a high quality.

Although the example of the system for binarizing the image concentration data has been described in the embodiments, the invention can be also similarly used in the case of converting the image concentration data into multivalues.

The present invention is not limited to the foregoing embodiments but many modifications and variations are possible within the spirit and scope of the appended claims of the invention.

What is claimed is:

1. An image processing apparatus comprising:
   digitizing means for digitizing image data of an objective pixel;
   process means for weighting, in order to correct error data generated in digitizing of the image data by said digitizing means, the error data and adding the weighted error data to image data of plural peripheral pixels in a periphery of the objective pixel; and
   detection means for detecting an edge direction of at least one of the peripheral pixels from the objective pixel;
   wherein said process means changes a ratio of weight of the error data for each peripheral pixel emphasize an edge, in accordance with the detected edge direction.

2. An apparatus according to claim 1, wherein said digitizing means digitizes the image data of the objective pixel at a predetermined threshold value to generate binary data.

3. An apparatus according to claim 2, wherein the error data to be corrected by said process means represents an error between the binary data and the image data of the objective pixel.

4. An apparatus according to claim 1, wherein, in order to correct the error data, said process means adds the weighted error data to the image data of the plural peripheral pixels within a predetermined peripheral range of the objective pixel.

5. An apparatus according to claim 4, wherein said process means changes, within a range from 0 to 1, exclusive, the ratio of weight of the error data for each of the plural peripheral pixels within the predetermined peripheral range of the objective pixel, in accordance with the edge direction.

6. An image processing apparatus comprising:
input means for inputting image data;
binarization means for binarizing the input image data;
process means for weighting error data generated in binarizing of the image data by said binarization means and adding the weighted error data to image data of pixels within a predetermined peripheral range of the binarized image data; and
detection means for detecting a feature of an image on the basis of the input image data,
wherein said process means weights the errors data such that error information is added to the image data of all of the pixels within the predetermined peripheral range, and changes a ratio of the weight in accordance with the feature of the image detected by said detection means such that the image data is binarized according to the feature of the image.

7. An apparatus according to claim 6, wherein the error data is represented by a difference between the image data input by said input means and binarization data after binarizing of the image data.

8. An apparatus according to claim 6, wherein said detection means detects an edge direction of the image, and said process means changes the ratio of the weight of the error data according to the detected edge direction such that an edge is emphasized.

9. An apparatus according to claim 6, wherein said detection means detects an edge amount of the image, and said process means changes the ratio of the weight of the error data according to the detected edge amount.

10. An apparatus according to claim 9, wherein said process means increases the ratio of the weight for pixels near the binarization-processed pixel, as the edge amount becomes larger.

11. An image processing apparatus comprising:
binarization means for binarizing image data of an objective pixel; and
detection means for detecting an edge direction and an edge amount of an image, from the image data within a predetermined block comprising plural pixels and including the objective pixel,
wherein said binarization means changes the binarization of the image data on the basis of the edge direction and the edge amount both detected by said detection means, such that the binarization can be performed according to a feature of the image.

12. An apparatus according to claim 11, wherein said binarization means binarizes the image data of the objective pixel at a predetermined threshold value and distributes an error between the image data and binarization image data after the binarization onto the image data of the peripheral pixels in a periphery of the objective pixel.

13. An apparatus according to claim 12, wherein said binarization means changes a ratio of weight at the time of distributing the error onto the image data of the peripheral pixels, on the basis of the edge direction and the edge amount detected by said detection means.

14. An image processing method comprising the steps of:
inputting image data;
binarizing the input image data;
processing the image data by weighting error data generated in said binarization step and adding the weighted error data to image data of pixels within a predetermined peripheral range of the binarized image data; and
detecting a feature of an image on the basis of the input image data,
wherein, in said processing step, the error data is weighted such that error information is added to the image data of all of the pixels within the predetermined peripheral range, and a ratio of the weight is changed in accordance with the feature of the image detected in said detection step such that the image data is binarized according to the feature of the image.

15. An image processing apparatus comprising:
input means for inputting image data of an objective pixel;
binarization means for binarizing the input image data of the objective pixel; and
process means for weighting error data generated in binarizing of the image data by said binarization means and adding the weighted error data to image data of plural pixels in a predetermined peripheral area of the objective pixel,
wherein said process means changes, if the objective pixel to be binarized is changed, a ratio of weight of the error data without changing a magnitude of the predetermined area to which the error data is distributed.

16. An apparatus according to claim 15, further comprising detection means for detecting a feature of an image from the image data input by said input means.

17. An apparatus according to claim 16, wherein said process means change as the ratio of weight of the error data in accordance with the feature of the image detected by said detection means.

18. An apparatus according to claim 17, wherein said detection means detects an edge amount and an edge direction of the image from the image data input by said input means.

* * * * *

UNITED STATES PATENT AND TRADEMARK OFFICE
CERTIFICATE OF CORRECTION

PATENT NO. : 4,878,125
DATED : October 31, 1989
INVENTOR(S) : AKIHIRO KATAYAMA, ET AL.

It is certified that error appears in the above-identified patent and that said Letters Patent is hereby corrected as shown below:

IN [57] ABSTRACT

Line 19, "high quality apparatus" should read --high quality image--.

COLUMN 1

Line 9, "mean" should read --means--.
Line 25, "the case" should read --a case--.
Line 33, "phenomenon, item (1)" should read --phenomenon (1)--.
Line 34, "phenomenon" should read --phenomenon,--.
Line 49, "method" should read --method,--.
Line 60, "odicily," should read --odicity,--.
Line 63, "image" should read --image,--.

COLUMN 2

Line 26, "image" should read --an image--.
Line 34, "is to" should read --is--.

COLUMN 3

Line 35, "to an" should read --to scan--.
Line 38, "examples," should read --example,--.
Line 40, "quantized" should read --(quantized)--.
Line 61, "sends" should read --sends the difference--.

UNITED STATES PATENT AND TRADEMARK OFFICE
CERTIFICATE OF CORRECTION

PATENT NO. : 4,878,125
DATED : October 31, 1989
INVENTOR(S) : AKIHIRO KATAYAMA, ET AL.

It is certified that error appears in the above-identified patent and that said Letters Patent is hereby corrected as shown below:

COLUMN 4

Line 31, "multiplied to" should read --multiplied by--.
   Line 58, "$\beta$denotes" should read --$\beta$ denotes--.

COLUMN 5

Line 7, "$\gamma_2(\gamma)$ and $\gamma_4(\gamma)$" should read
      --$\alpha_2(\gamma)$ and $\alpha_4(\gamma)$--.
   Line 11, "$\epsilon_{i,j-1}$ and $\epsilon_{i,j-1}$" should read
      --$\epsilon_{i,j-1}$ and $\epsilon_{i-1, j-1}$--.
   Line 60, "to" should read --by--.

COLUMN 6

Line 24, "$0 \leq \gamma > 120$," should read --$0 \leq \gamma < 120$,--.
   Line 36, "$\alpha_1 1$," should read --$\alpha_1 = 1$,--.

COLUMN 7

Line 3, "selector" should read --selector 20--.
   Line 50, "the" (first occurrence) should be deleted.
   Line 65, "embodiment" should read --embodiment,--.
   Line 68, "assume" should be deleted.

COLUMN 8

Line 3, "subtractor 53." should read --subtracter 53.--.
   Line 5, "subtractor 53." should read --subtracter 53.--.
   Line 6, "subtractor 53" should read --subtracter 53--.

UNITED STATES PATENT AND TRADEMARK OFFICE
CERTIFICATE OF CORRECTION

PATENT NO. : 4,878,125

DATED : October 31, 1989

INVENTOR(S) : AKIHIRO KATAYAMA, ET AL.

It is certified that error appears in the above-identified patent and that said Letters Patent is hereby corrected as shown below:

COLUMN 9

Line 31, "242f to" (second occurrence) should be deleted.
Line 38, "subtractor 244a." should read
    --subtracter 244a.--.
Line 40, "subtractor 244b." should read
    --subtracter 244b.--.
Line 41, "substractor 244a." should read
    --subtracter 244a.--.
Line 45, "subtractor 244b." should read
    --subtracter 244b.--.
Line 50, "subtractors 244a and 244b" should read
    --subtracters 244a and 244b--.
Line 56, "subtractor 244a" should read
    --subtracter 244a--.
Line 61, "subtractor 244b" should read
    --subtracter 244b--.

COLUMN 10

Line 5, "difference" should read --differences--.
Line 17, "subtractor 244a" should read
    --subtracter 244a--.
Line 20, "$\alpha_2$" should read --$\beta_2$-- and "subtractor 224b"
    should read --subtracter 244b--.
Line 33, "subtractor 244a" should read
    --subtracter 244a--.
Line 37, "subtractor 244b" should read
    --subtracter 244b--.

UNITED STATES PATENT AND TRADEMARK OFFICE
CERTIFICATE OF CORRECTION

PATENT NO. : 4,878,125

DATED : October 31, 1989

INVENTOR(S) : AKIHIRO KATAYAMA, ET AL.

It is certified that error appears in the above-identified patent and that said Letters Patent is hereby corrected as shown below:

COLUMN 10

Line 38, "follows." should read --follows:--.
    Line 48, "subtractor 244a" should read --subtracter 244a--.
    Line 52, "subtractor 244b" should read --subtracter 244b--.
    Line 53, "follows" should read --follows:--.
    Line 62, "213a," should read --231a,--.

COLUMN 11

Line 38, "subtractor 272" should read --subtracter 272--.

COLUMN 12

Line 53, "empha-" should read --to empha- --.

COLUMN 13

Line 18, "errors data" should read --error data--.

UNITED STATES PATENT AND TRADEMARK OFFICE
CERTIFICATE OF CORRECTION

PATENT NO. : 4,878,125

DATED : October 31, 1989

INVENTOR(S) : AKIHIRO KATAYAMA, ET AL.

It is certified that error appears in the above-identified patent and that said Letters Patent is hereby corrected as shown below:

COLUMN 14

Line 50, "change" should read --changes--.

Signed and Sealed this

Fourth Day of February, 1992

Attest:

HARRY F. MANBECK, JR.

*Attesting Officer*     *Commissioner of Patents and Trademarks*